June 14, 1927.                                         1,632,136
I. IKEDA
METHOD OF MEASURING MAXIMUM CURRENT
Filed Dec. 30, 1924           3 Sheets-Sheet 1
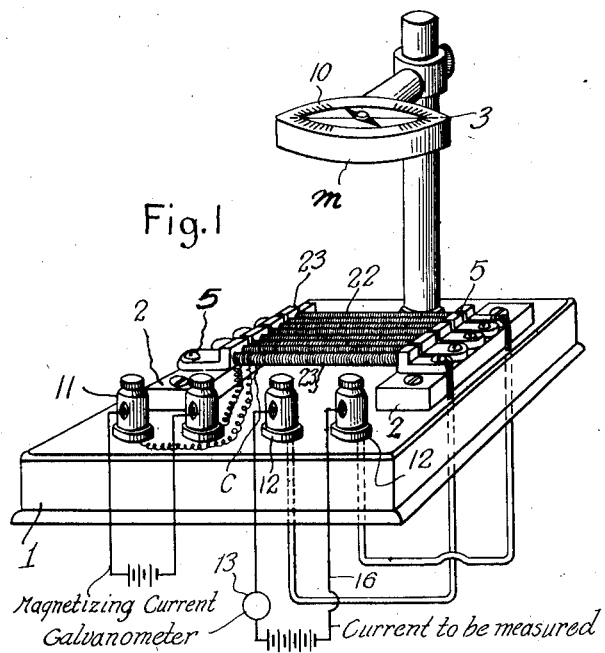
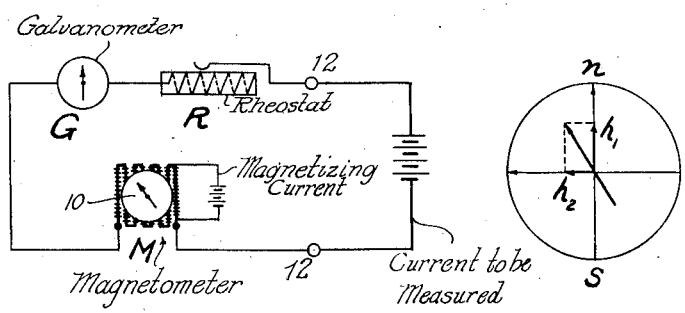
Inventor
Iwao Ikeda June 14, 1927. 1,632,136
I. IKEDA
METHOD OF MEASURING MAXIMUM CURRENT
Filed Dec. 30, 1924 3 Sheets-Sheet 2

Inventor
Iwao Ikeda
by Connolly Bros
Atty

June 14, 1927.

I. IKEDA 1,632,136

METHOD OF MEASURING MAXIMUM CURRENT

Filed Dec. 30, 1924      3 Sheets-Sheet 3

Inventor

Patented June 14, 1927.

1,632,136

UNITED STATES PATENT OFFICE.

IWAO IKEDA, OF SENDAI, JAPAN.

METHOD OF MEASURING MAXIMUM CURRENT.

Application filed December 30, 1924, Serial No. 758,954, and in Japan January 8, 1924.

This invention has relation to a method and means for the indication and measurement of the maximum value or strength of electric currents flowing through given circuits and has for its object the provision of a novel method and means for determining the maximum value or strength of a current at any period notwithstanding the fluctuations or variations which may have taken place in such current.

My invention is based on the fact which I have found by experiment that the residual magnetism inherent in a bar of crude iron or soft steel after being magnetized will be reduced by the passage axially through such bar of an electric current, and that the extent of such reduction of magnetism may be determined by means of a suitable magnetometer. Furthermore, as I have found, there exists such a relation between the magnetic state or condition of the residually magnetic bar, and the value or strength of the current passing through such bar, as indicated by a galvanometer or like device, that by comparison of the indications of the magnetometer and those of the galvanometer the changes in current from its maximum strength or value may be accurately determined so that while the current flowing or passing through the bar may be fluctuating or variable the maximum value which such current has reached will be shown by the position of the magnetometer needle, it being understood, of course, that while an increase in the current will reduce the residual magnetism, a decrease in the current will not effect any change in the residual magnetism, so that when the magnetometer needle reaches a position brought about by the current at its maximum strength, it will retain such position regardless of any reduction that may afterwards take place in the strength of the current.

As a further illustration of the principles involved, it is to be noted that if a bar or series of bars of properly magnetizable material arranged in parallel relation and wound with conducting wires are arranged with their axes perpendicular to the direction of the earth magnetism, a magnetometer placed above them will respond to the magnetic conditions present and its pointer or index will take a position resultant from the difference between the magnetic strength of the earth magnetism and the residual magnetism of the magnetizable bars. If then, a current of electricity be sent axially through the bars a change in the magnetic conditions will take place with the result that the needle of the magnetometer will move in the direction of the lines of the earth magnetism to an extent proportioned to the strength of the current. Now, if the current be decreased in strength, the needle of the magnetometer will not be affected, consequently, if the initial current flow be of maximum value this value will be indicated by the position of the needle while, if a galvanometer be interposed in the circuit, the strength or value of the current at any time will be thereby indicated and the amount of variation, i. e. reduction of the current from maximum, determined. It is to be understood that the term "residual" as applied to the inherent magnetism of the bars of magnetic material is used in a relative sense to indicate that the bars are possessed of some magnetism either naturally inherent, or artificially produced, as by the momentary passage of a current from a generator through the coils with which the bars may be wound, hence if the bars be so magnetized by a current and the latter discontinued the magnetometer needle will assume a position depending on the strength of the residual magnetism and proportioned thereto. The passage of a current of maximum value through the magnet bars or cores will cause the needle to assume a new position dependent upon the strength of the current, which position it will retain regardless of the reduction thereafter of the current and so indicate the value of the current at its maximum.

My invention consists in the provision of a method and means for indicating the maximum value or strength of an electric current flowing through a given circuit through the agency of a magnetometer and associated instrumentalities as hereinafter more specifically described and claimed.

In the accompanying drawings forming part of this specification,

Figure 1 is a perspective view of an instrument or apparatus embodying the essential features of my invention.

Figure 2 is a diagram representing the relations existing between the changes in magnetic force in a series of bars possessing residual magnetism and a current flowing through said bars.

Figure 3 is a diagram illustrating the action of two magnetic fields in perpendicular relation to each other upon a magnetic needle.

Figure 4:
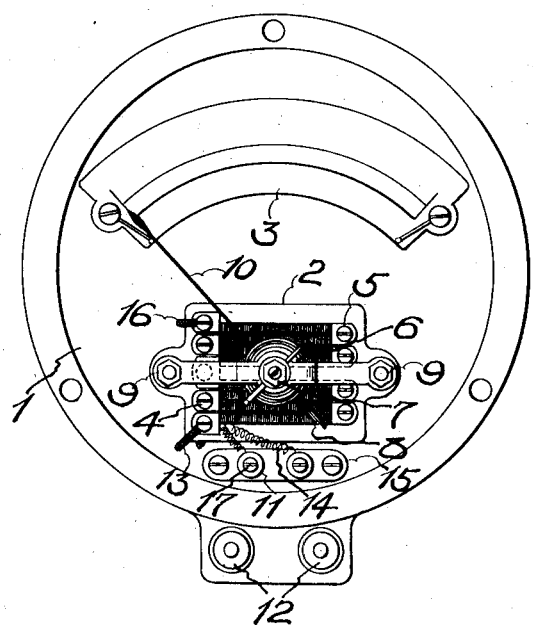
Figure 4 is a plan view of a complete maximum current indicator or meter embodying the mechanical features of my invention.
Figure 5:
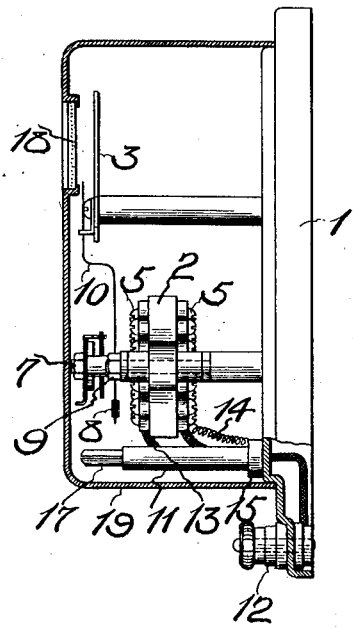
Figure 5 is a side view partly in section of the instrument shown in Figure 4.

Referring now more particularly to Fig. 1, 1 is a base on which are mounted two ebonite blocks 2, 2, on which are supported at their ends a plurality of bars 23, of crude iron or soft steel possessing magetic properties or remanence, upon each of which is wound a coil of wire 22. The bars 23 are connected at their ends in series relation by connecting pieces 5, of non-magnetic conducting material and the terminal ends are connected to wires leading to binding posts 12, 12, intended and adapted for the use of conducting wires 13, 16 in circuit with a source of electricity, the maximum current of which is to be determined.

The coils of the magnets are so wound that a current flowing therethrough will energize all the magnets in the same direction and the terminals of these coils lead to binding posts 11, through which circuit is made with a suitable generator.

A magnetometer 3 and 10 adapted to measure and indicate the magnetic changes which may take place in the magnet bars or magnetism, is arranged and supported above the magnets 23.

Now if this instrument be arranged in such a manner that the magnets 23 lie perpendicularly to the direction of the earth's magnetism, the needle of the magnetometer will point in a direction of the resultant, i. e. the sum of the horizontal components of the earth magnetism and the magnetism of the bars 23 as conventionally represented in Figure 3 by the position of the arrow pointing obliquely to the vertical and horizontal diametrical lines $h_1$, $h_2$ which indicate, respectively, the direction of the lines of force of the earth magnetism and the magnetism of the bars.

If, now, as illustrated in Figure 2, which is diagrammatic of the devices shown in Figure 1, the magnetic bars 23 be connected in series with a galvanometer G and a rheostat R, in circuit with a source of current through terminals 12, 12, a current passed through the circuit will affect the galvanometer and the strength of the current will be indicated thereby. If then a current from a different source be passed through the coils surrounding the magnets 23, the latter will be magnetized thereby to a certain magnetic value and the needle of the magnetometer 10 will take a direction indicated by the position of the needle shown in Figure 2. If, now the current through the magnet bars 23, be gradually increased as by the proper adjustment of the rheostat, the magnetic force developed in the magnets 23, will decrease gradually and the needle of the magnetometer will indicate this decrease by its approach to the position of the line N. S (Figure 3), the movements of the magnetometer needle and the needle of the galvanometer keeping in constant relation to each other.

If, however, the current through the magnet bars 23, be decreased from a certain value, the needle of the magnetometer will not be affected, notwithstanding the fact that the galvanometer will move according to the decrease in current.

Figure 6:
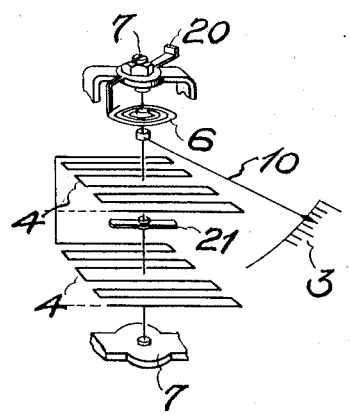
Figure 6 is a diagrammatic view illustrating the construction and relation of the mechanical features of my invention.
Figure 7:
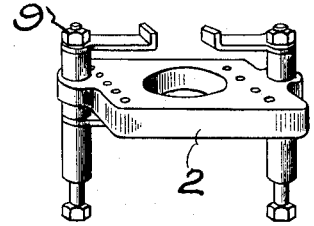
Figure 7 is a perspective view of part of the frame work of the indicating instrument or magnetometer.

If then, in a properly constructed instrument, based on the principles above mentioned, the scale of the magnetometer be proportioned to that of the galvanometer, the maximum value or strength of the current indicated by the galvanometer will be shown by the position of the magnetometer needle at any time and constantly during the passage of the current, regardless of the fluctuations of the current occurring after such maximum value has been reached. In Figures 4 to 9 I have shown means whereby the torque of a spiral spring is used to initially position the needle of the magnetometer instead of the attraction of the earth magnetism. Figure 6 illustrates in diagrammatic form a plurality of straight magnetizable bars arranged in two series one above the other, with the bars parallel to each other. These are designated 4, 4. Between the two series is placed a magnetic needle 21, which is attached to a vertical spindle, mounted in top and bottom pivotal bearings 7, 7. 6 designates a spiral spring of the nature of the balance spring of a watch. This spring is secured at its inner end to the spindle and, at its outer end, bears against a stop mounted above it and carried by the upper bearing. This stop, designated 20, is formed as a lever with a depending finger with which the spring contacts, and constitutes a regulating member by which the torque of the spring may be varied, or adjusted so that the needle will be caused to assume a position with reference to a graduated scale 3, indicating zero, when the bars 4, 4 are magnetized. Assuming that the bars 4, 4 are of like polarity, if, then, a current be caused to pass through them in the direction of their length, the magnetism which they possess will be reduced and the needle 21 of the magnetometer will move and stop in a position in which the magnetic force is balanced by the torque of the spring 6. Further movement of the needle will take place only upon an increase of current. No movement however will result from a decrease of current strength, hence the position of the needle and the indication upon the scale denotes the maximum value of the current and remains a constant indication thereof, regardless of the fluctuations of the current below the maximum point.

The principles governing the operations above described are briefly these: In bars of magnetizable metal capable of retaining residual magnetism there are certain lines of magnetic induction which are parallel to the magnetic axis and residual magnetism appears at both ends of a residually magnetic bar. If electric current flows through the magnet in an axial direction a concentric magnetic field, which is perpendicular to the magnetic axis of the magnets, is produced by the said current and acts upon the said magnetic field to dispose the molecular magnets concentrically with the current magnetic field. On this account, the residual magnetism will be reduced. And since the magnetization, when the current fluctuates, depends upon the maximum value of the current, reduction of the residual magnetism also depends upon the maximum current. Even if the direction of current changes and the direction of magnetization is reversed, the change of the residual magnetism only depends upon magnetizing intensity but not upon the direction. The magnetic change, therefore, depends upon the absolute value of the current when the alternating current flows.

In Figures 4, 5, 7, 8 and 9, which illustrate the construction of an instrument intended and adapted for practical use, 1 denotes an iron base and 2 a plate of fibre or bakelite, having an annular opening in its center (Fig. 7), on each side of which are arranged two series of electro-magnets secured to the plate 2, by means of brass pieces 5 and fastening screws. Current may be supplied from terminals 12 to the cores of these magnets through conductors 13 and 16.

8 is a balance weight on the short end of the pointer 10 of a magnetometer. Plate 2 is attached to supports 9 together with four washers and two bearing bars for the spindle on each side of the plate. The coils 22 around the magnets are connected in series and through conductors 14 to the terminals 11 which are insulated from base 1. The forward ends 17 of the terminals 11 are each slitted to receive plugs of a magnetizing current conductor which plugs may be inserted through the openings in the case 19.

Figure 8:
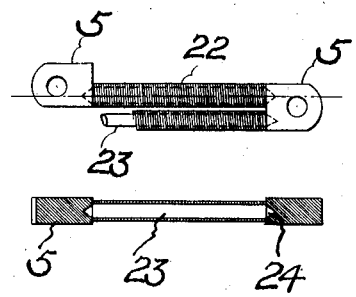
Figures 8 and 9 are detail views.

Figure 8 shows the construction of the magnets. 23 are magnets made of soft steel wire, the surface of which is enameled. Both ends of the said magnets are of conical shape and are plated with silver to avoid the contact resistances which might arise from oxidization of the steel when they are placed in the conical recesses of the brass pieces 5.

Case 19 is made of iron plate to avoid the effects of earth magnetism and external stray magnetic fields and has a curved opening 18 for the scale 3 and plug holes.

Figure 9:
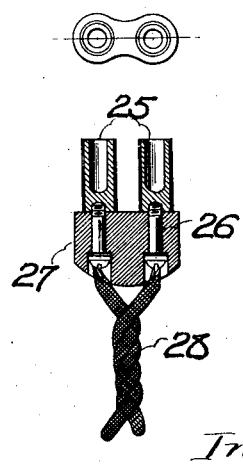

In the plug of Figure 9, 27 is an ebonite body which is penetrated by two bolts 26, and by means of which the cords 28 and two legs 25 are fixed to the said body 27. The legs are covered with ebonite and are perforated axially for receiving the terminal 17.

It is to be noted that the current through coils 22 must be sufficient to produce magnetic saturation, and that the direction of the current must be constant.

It is to be understood that, in the use of the instrument described, under various modifications, the sequence of operations is as follows.

Assuming the magnets or magnetizable bars (23) to be in an unmagnetized state, the first step is to energize them by means of a current circulated through the magnetizing coils. The magnetization thus produced will cause the needle of the magnetometer to assume a position depending upon the magnetic strength of the bars, balanced or counteracted by the torsion of the restraining spring, that is, a zero position transverse of or at an angle to the axis of the bar. The duration of the magnetizing current should be instantaneous only and not prolonged. After the cessation of the current flow, the bars, now possessed of residual magnetism or remanence, are connected in circuit with the current to be measured.

The effect of such current will be to reduce the residual magnetism of the bars to an extent proportioned to the strength of the current, and to cause the magnetometer needle to move to a corresponding position. So long as the current maintains a constant strength or value, the magnetometer needle will remain inert, but should the current increase in value, the needle will move further on account of the further reduction of the residual magnetism of the bars. No movement, however, of the needle will follow a reduction on the strength or value of the current, hence the magnetometer will only indicate the maximum value or strength of the current, but not its fluctuations.

The calibration of the dial of the magnetometer is, of course, in such correspondence with that of the galvanometer, that the position of the magnetometer needle will indicate in numerical terms the maximum strength or value attained by the current during its passage through the magnetic bars.

After discontinuance of the flow of current through the bars, a re-use of the instrument requires a re-energization of the magnet bars by a momentary current through the coils, so as to cause the magnetometer needle to return to zero.

The meter of my invention, as hereinbefore described, is adapted to not only indicate the maximum value of a direct or alternating current, but also that of an oscillating or momentary current.

The main uses of this invention are as follows:

1. The indication of maximum current or voltage for safety purposes.

2. The measurement of maximum or minimum changes of temperature, pressure or velocity which can be indicated by an electric current.

3. The indications of the breaking of insulators or the fusing of current conductors in heaters.

4. The measurement of instantaneous current produced by the discharge of induction coils or condensers.

5. The indication of maximum current at a distance.

I claim.

1. The method of determining the maximum value of an electric current which consists in registering the reduction of magnetism produced by such current in a field of residual magnetism, subject to the influence of the current and while the current is of the value of a given or known voltage, less than the maximum and thereafter registering further reduction of residual magnetism produced by an increase in current value or strength.

2. A maximum current meter adapted to indicate current value in accordance with magnetic changes, comprising two horizontal layers of magnets, a magnetic needle mounted rotatably between said layers, a vertical spindle to which said needle is attached, a spiral spring fixed to the said spindle to counteract the magnetic force of the said magnets, coils wound in series upon said magnets to magnetize the same and restore the needle to the zero point, the cores of said magnets being arranged and adapted to be placed in circuit axially with the source of current to be measured, and the coils arranged and adapted for the passage therethrough of a magnetizing current.

3. A magnetometric instrument for the indication and measurement of electric current comprising a system of magnets and a a magnetometer arranged and adapted to indicate magnetic changes in the cores of said magnets, said magnets being in circuit axially with the conductors of a source of current to be indicated and measured and the coils of said magnets being in the circuit of a separate source of current.

IWAO IKEDA.